(12) United States Patent
Aihara et al.

(10) Patent No.: US 9,632,262 B2
(45) Date of Patent: Apr. 25, 2017

(54) OPTICAL MODULE

(71) Applicant: JAPAN AVIATION ELECTRONICS INDUSTRY, LIMITED, Tokyo (JP)

(72) Inventors: Shuichi Aihara, Tokyo (JP); Keiichi Mori, Tokyo (JP); Takayoshi Yamauchi, Tokyo (JP); Osamu Hashiguchi, Tokyo (JP); Eiichi Asami, Tokyo (JP); Yoshihiko Hamada, Tokyo (JP); Masuo Nishimoto, Tokyo (JP); Hideo Sugimoto, Tokyo (JP); Akira Watanabe, Tokyo (JP); Satoshi Kai, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 15/125,329

(22) PCT Filed: Apr. 15, 2015

(86) PCT No.: PCT/JP2015/061552
§ 371 (c)(1),
(2) Date: Sep. 12, 2016

(87) PCT Pub. No.: WO2015/174194
PCT Pub. Date: Nov. 19, 2015

(65) Prior Publication Data
US 2017/0075082 A1      Mar. 16, 2017

(30) Foreign Application Priority Data
May 14, 2014   (JP) ................................. 2014-100521

(51) Int. Cl.
*G02B 6/36* (2006.01)
*G02B 6/26* (2006.01)
(Continued)

(52) U.S. Cl.
CPC ............. *G02B 6/4231* (2013.01); *G02B 6/32* (2013.01); *G02B 6/325* (2013.01); *G02B 6/4214* (2013.01)

(58) Field of Classification Search
CPC . G02B 6/32; G02B 6/34; G02B 6/325; G02B 6/4214; G02B 6/4231
(Continued)

(56) References Cited

U.S. PATENT DOCUMENTS 8,708,579 B2    4/2014   Shiratori et al.
8,818,147 B2 *  8/2014   Kuroda ................. G02B 6/122
                                                                385/14

(Continued)

FOREIGN PATENT DOCUMENTS

JP        2006-184680 A      7/2006

OTHER PUBLICATIONS

International Search Report issued in International Patent Application No. PCT/JP2015/061552, dated Jun. 30, 2015.

*Primary Examiner* — Robert Tavlykaev
(74) *Attorney, Agent, or Firm* — Greenblum & Bernstein, P.L.C.

(57) ABSTRACT

An optical module is formed of a first optical block and a second optical block each equipped with a lens the optical axis of which needs to be aligned, the blocks being positioned and secured to each other, and has stepwise positioning means. A positioning means includes spring pieces each having an abutting slope, and edges. Four spring pieces are formed in the second optical block such that their abutting slopes are disposed at four corners of the second optical block. Positioning is implemented when the abutting slopes meet the edges of the first optical block. Another positioning means includes a depressed part and a guide slope formed in one of the two optical blocks and a raised part formed in the (Continued)

other optical block. The raised part is fitted into the depressed part.

9 Claims, 10 Drawing Sheets

(51) Int. Cl.
*G02B 6/42* (2006.01)
*G02B 6/32* (2006.01)

(58) Field of Classification Search
USPC ............... 385/31, 33, 36, 47, 88, 89, 92, 93; 398/139, 200, 201, 212, 214
See application file for complete search history.

(56) References Cited

U.S. PATENT DOCUMENTS

| | | | |
|---|---|---|---|
| 8,834,036 B2 | 9/2014 | Aihara | |
| 8,882,363 B2* | 11/2014 | Dong | G02B 6/36 385/77 |
| 9,063,300 B2 | 6/2015 | Torikai et al. | |
| 9,103,984 B2* | 8/2015 | Son | G02B 6/4214 |
| 2002/0071636 A1* | 6/2002 | Bazylenko | G02B 6/30 385/49 |
| 2006/0067630 A1* | 3/2006 | Kim | G06F 1/1683 385/88 |
| 2006/0274997 A1* | 12/2006 | Furuno | G02B 6/4204 385/89 |
| 2013/0270427 A1* | 10/2013 | Hsiao | H01L 31/0203 250/227.28 |
| 2014/0016898 A1* | 1/2014 | Lee | G02B 6/32 385/33 |
| 2016/0154185 A1 | 6/2016 | Mori et al. | |

* cited by examiner

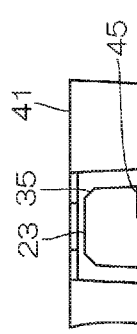
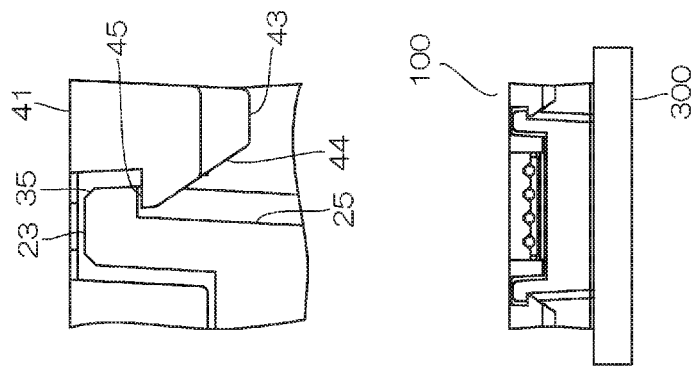
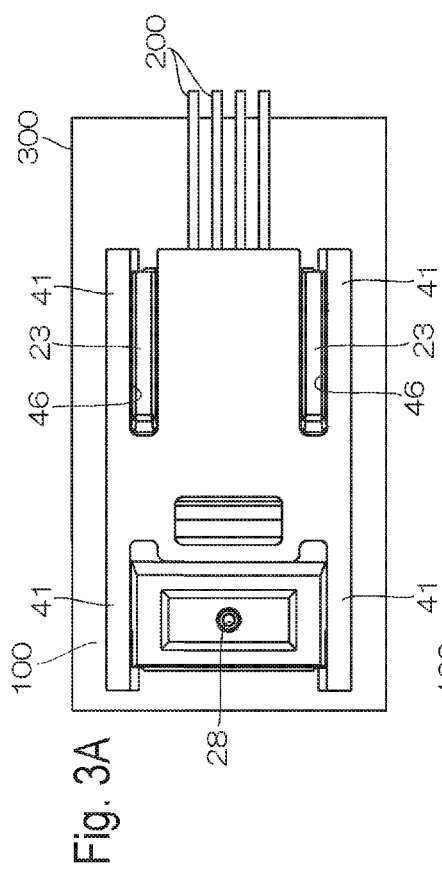
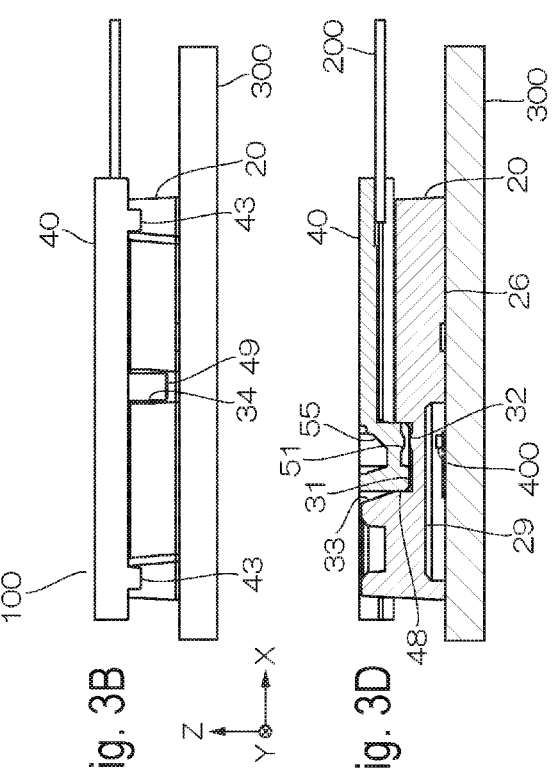

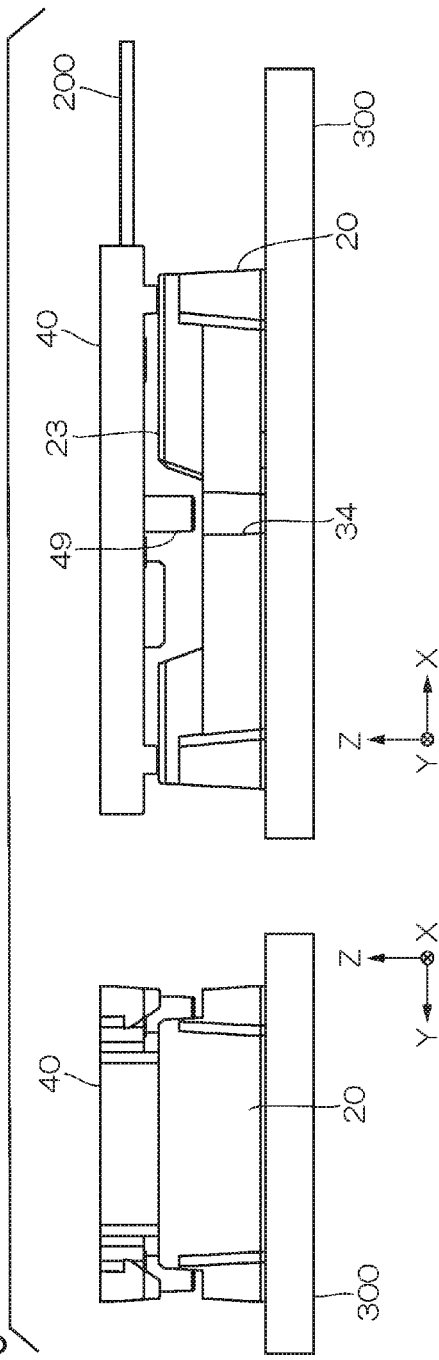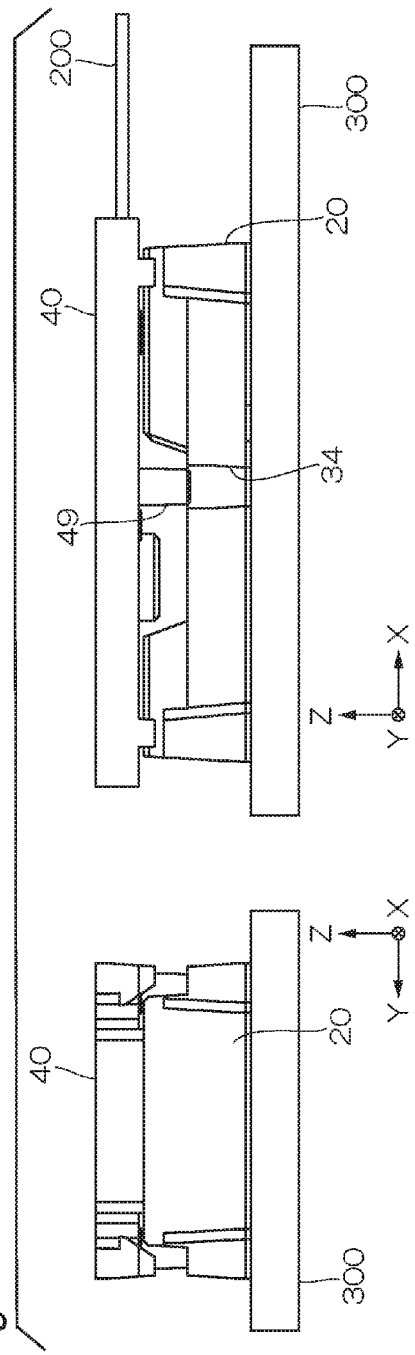

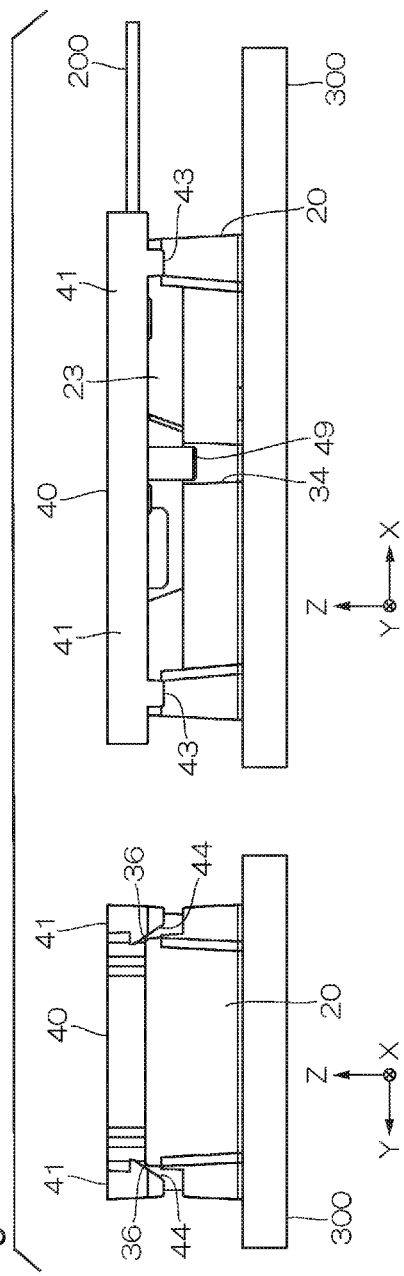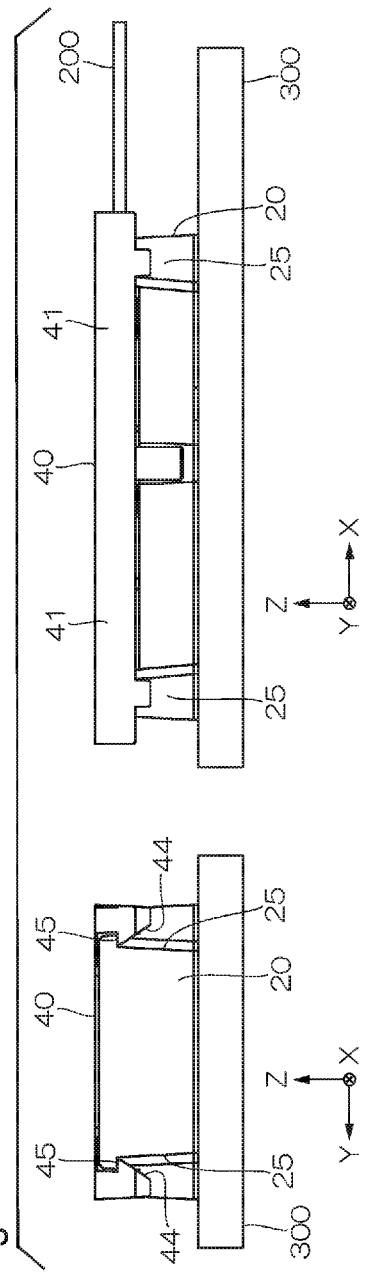

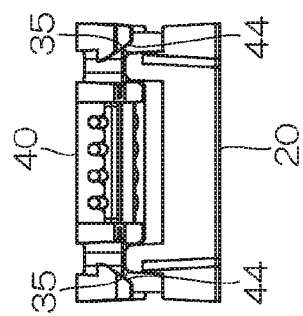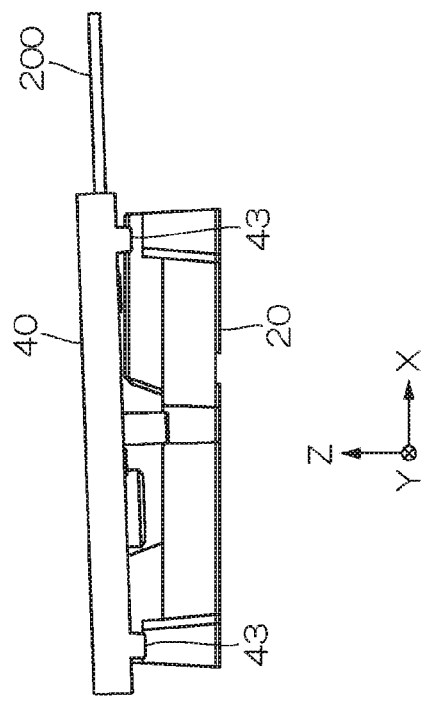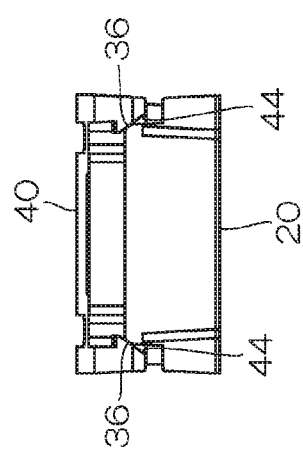

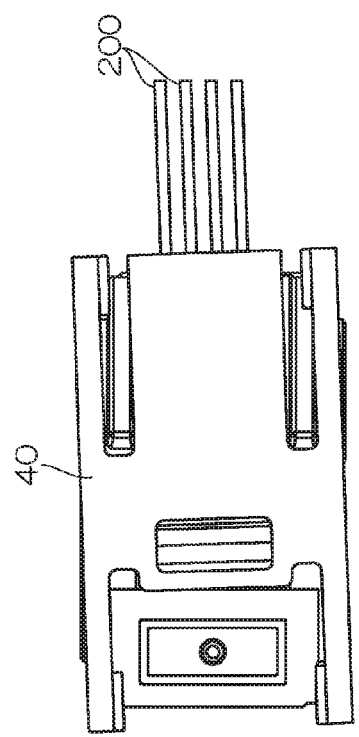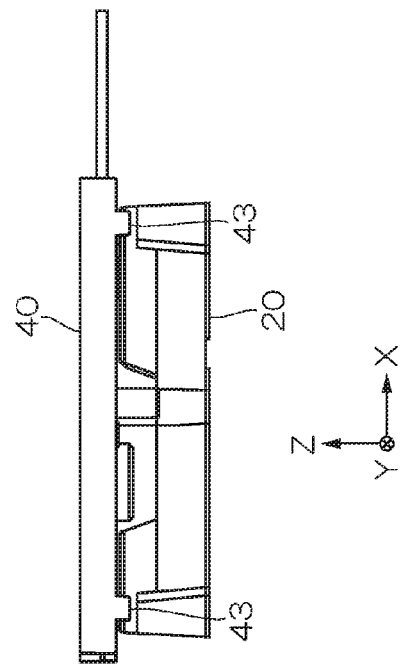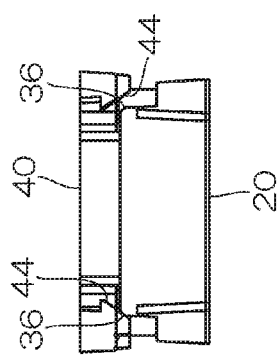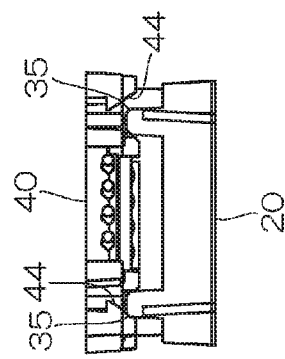

OPTICAL MODULE

TECHNICAL FIELD

The present invention relates to an optical module which is used to optically connect an optical device, such as a light-emitting device or a light-receiving device, and an optical fiber.

BACKGROUND ART

FIG. 1 shows a configuration disclosed in Patent literature 1 as a conventional example of an optical module of this sort, in which an optical connector 12 mounted to a tip part of an optical fiber 11 is mounted to a circuit board 13. The circuit board 13 includes a board 17 on which a photoelectric conversion module 16 formed of an optical device 14 and a mount 15 equipped with the optical device 14 is mounted.

A connector body 12a of the optical connector 12 is equipped with two positioning pins 18, and positioning-pin holes 19 are formed in the mount 15. The optical connector 12 and the photoelectric conversion module 16 are positioned by inserting the positioning pins 18 of the optical connector 12 into the positioning-pin holes 19 of the mount 15 to engage them with each other, thereby causing the connector body 12a and the mount 15 to be positioned with high precision and making an optical connection between the optical device 14 and the optical fiber 11. In FIG. 1, the reference character 12b denotes a reflecting surface for changing the optical axis.

PRIOR ART LITERATURE

Patent Literature

Patent literature 1: Japanese Patent Application Laid Open No. 2006-184680

SUMMARY OF THE INVENTION

Problems to be Solved by the Invention

To obtain a high optical coupling efficiency in the optical connection between an optical device and an optical fiber, their optical axes need to be aligned with high precision. Therefore, if the positioning pins 18 and the positioning-pin holes 19 as described above are used in positioning, the clearance between a positioning pin 18 and the corresponding positioning-pin hole 19 must be extremely small.

If the clearance between the positioning pin 18 and the positioning-pin hole 19 is extremely small, it is not easy to fit the positioning pin 18 into the positioning-pin hole 19, and when they are to be engaged, the positioning pin 18 and the positioning-pin hole 19 cannot be seen, causing such problems that the fitting task takes time and cannot be performed easily.

An object of the present invention is to provide an optical module formed of two optical blocks that require high-precision fitting, the optical module being configured to facilitate the fitting task.

Means to Solve the Problems

According to the present invention, an optical module includes a first optical block and a second optical block each equipped with a lens the optical axis of which needs to be aligned, the blocks being positioned and secured to each other. The positioning is performed stepwise by first, second, and third positioning means. The first positioning means is configured by visible shapes in a state in which the second optical block is placed above the first optical block. The second positioning means is configured by spring pieces each having a protrusion with an abutting slope at a distal end thereof, and edges which meet the abutting slopes, the four spring pieces being formed in the second optical block such that the abutting slopes are disposed at four corners of the second optical block. Two of the abutting slopes disposed close to one end in the longitudinal direction of the second optical block are formed such that they make mirror images of each other, the protrusions sticking out toward the first optical block taper off to protruding ends thereof, two of the abutting slopes disposed close to the other end in the longitudinal direction are disposed in the same planes as the abutting slopes disposed on the extensions in the longitudinal direction, and the second step of positioning is implemented when the abutting slopes meet the edges of the first optical block and are pushed in. The third positioning means is configured by a raised part, a depressed part into which the raised part is fitted, and a guide slope which guides the raised part into the depressed part, the depressed part and the guide slope being formed in one of the two optical blocks, and the raised part being formed in the other optical block. When the longitudinal direction is called the X-axis direction and the direction orthogonal to the X-axis direction in the opposing faces is called the Y-axis direction, the abutting slopes are parallel to the X-axis, and the guide slope is parallel to the Y-axis.

Effects of the Invention

According to the invention, in an optical module which requires high-precision fitting of a first optical block and a second optical block, rough visual positioning is performed first, and then pressing the second optical block against the first optical block advances further positioning stepwise. In other words, a high-precision positioned state is established stepwise. Therefore, even though parts that require high-precision fitting cannot be seen, the fitting task can be carried out easily, and the optical module is easy to assemble in that respect.

BRIEF DESCRIPTION OF THE DRAWINGS

FIG. 3A is a plan view of the optical module in the state shown in FIG. 2; FIG. 3B is a front view of the optical module in the state shown in FIG. 2; FIG. 3C is a right side view of the optical module in the state shown in FIG. 2; FIG. 3D is a sectional view of the optical module in the state shown in FIG. 2; and FIG. 3E is a partially enlarged view of FIG. 3C;

FIG. 7A is a view for illustrating a fitting process of the first optical block and the second optical block; and FIG. 7B is a view for illustrating the fitting process of the first optical block and the second optical block;

FIG. 8A is a view for illustrating the fitting process of the first optical block and the second optical block; and FIG. 8B is a view for illustrating the fitting process of the first optical block and the second optical block;

FIG. 9A is a front view showing a state in which the second optical block is inclined in the fitting process of the first optical block and the second optical block; FIG. 9B is a left side view of the state shown in FIG. 9A; and FIG. 9C is a right side view of the state shown in FIG. 9A; and FIG. 10A is a plan view showing a state in which the second optical block is in a wrong orientation in the fitting process of the first optical block and the second optical block; FIG. 10B is a front view of the state shown in FIG. 10A; FIG. 10C is a left side view of the state shown in FIG. 10A; and FIG. 10D is a right side view of the state shown in FIG. 10A.

DETAILED DESCRIPTION OF THE EMBODIMENT

Now, an embodiment of the present invention will be described.

Figure 1:
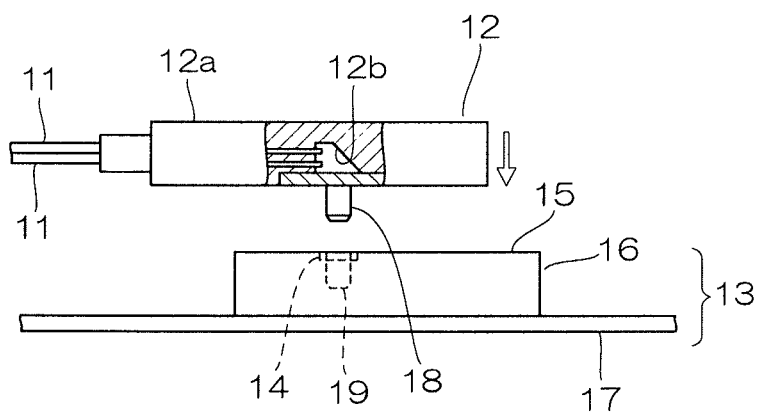
FIG. 1 is a partially sectional view showing a conventional optical module.
Figure 2:
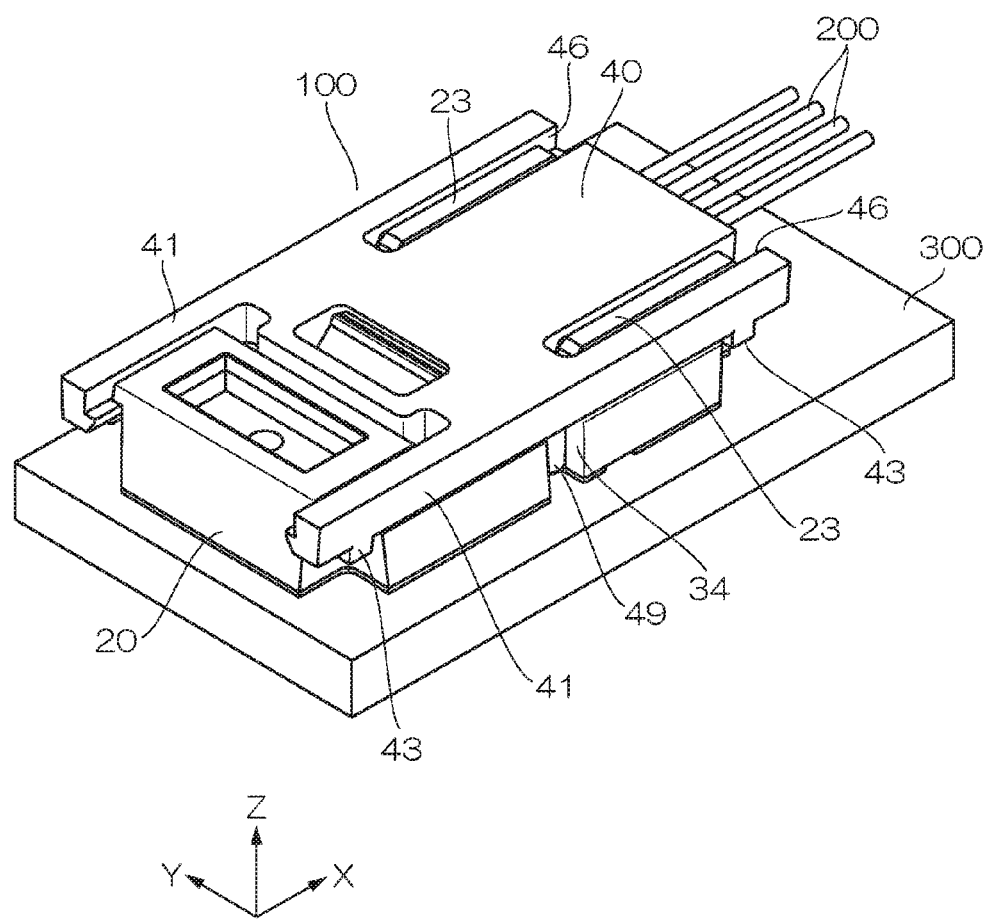
FIG. 2 is a perspective view showing a state in which an optical module according to an embodiment of the present invention is mounted on a board.
Figure 4:
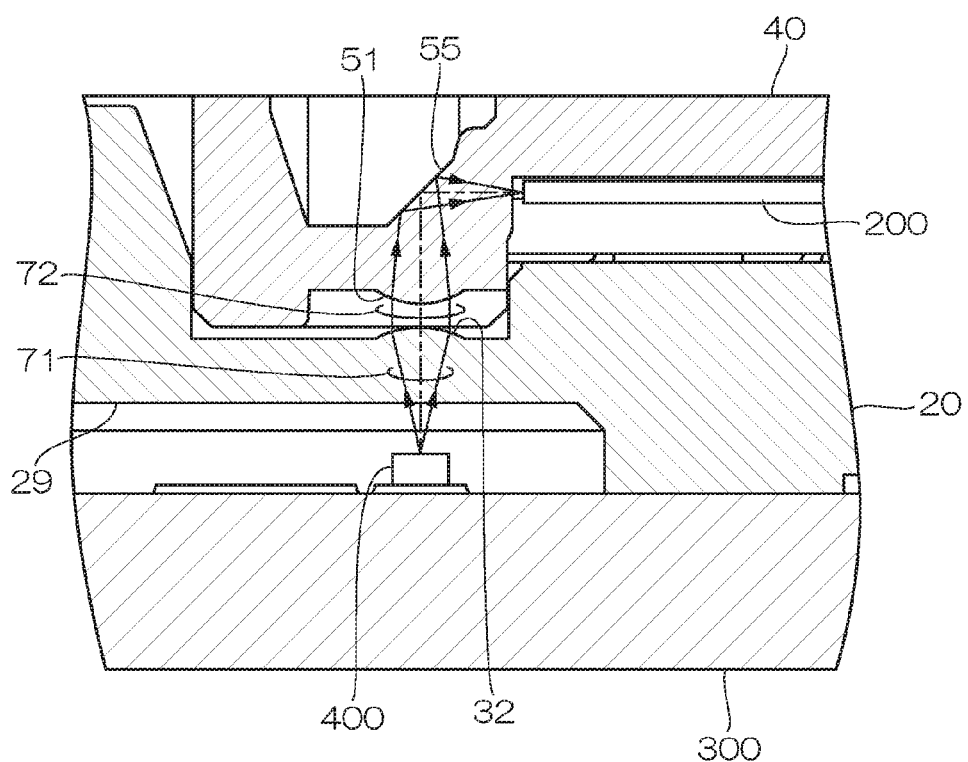
FIG. 4 is a partially enlarged view of FIG. 3D.
Figure 5A:
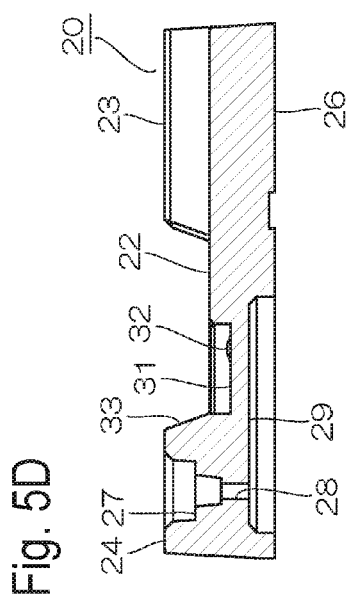
FIG. 5A is a plan view of a first optical block in FIG. 2.
Figure 5D:
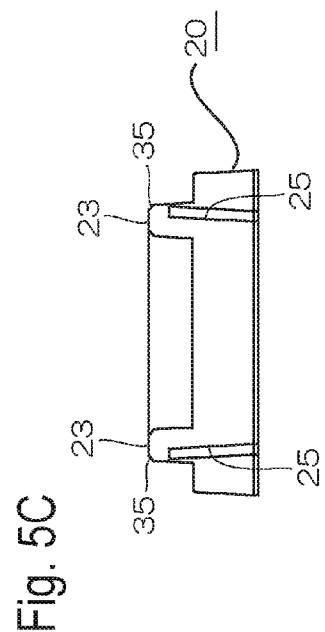
FIG. 5D is a sectional view of the first optical block shown in FIG. 5A.
Figure 5B:
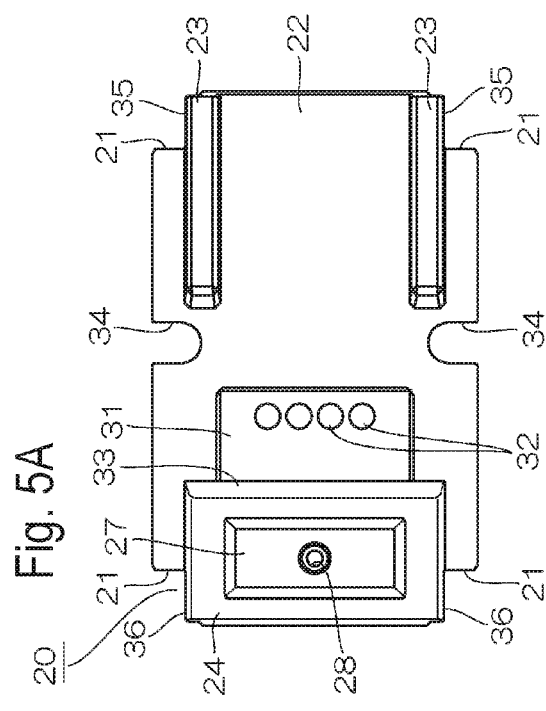
FIG. 5B is a front view of the first optical block shown in FIG. 5A.
Figure 5C:
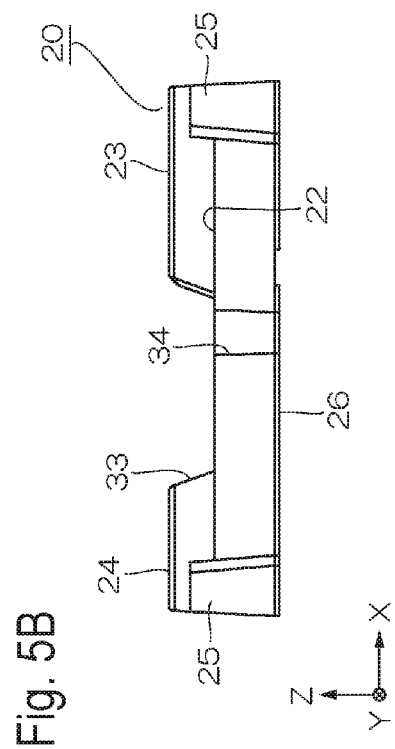
FIG. 5C is a right side view of the first optical block shown in FIG. 5A.
Figure 6C:
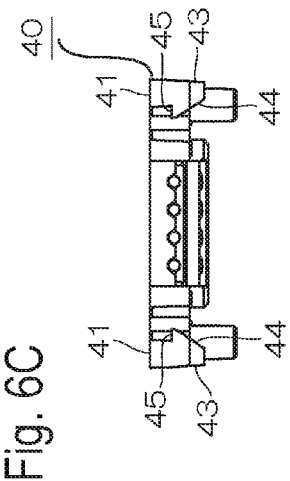
FIG. 6C is a right side view of the second optical block shown in FIG. 6A.
Figure 6D:
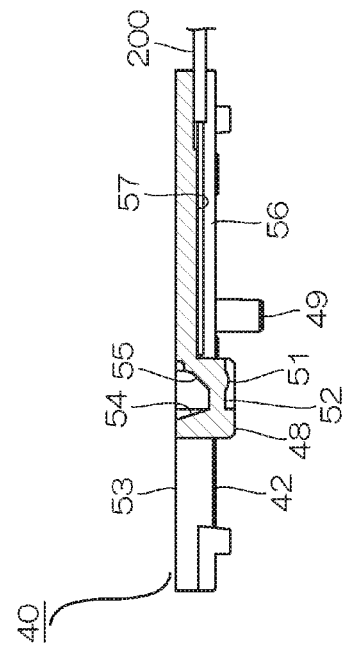
FIG. 6D is a sectional view of the second optical block shown in FIG. 6A.
Figure 6A:
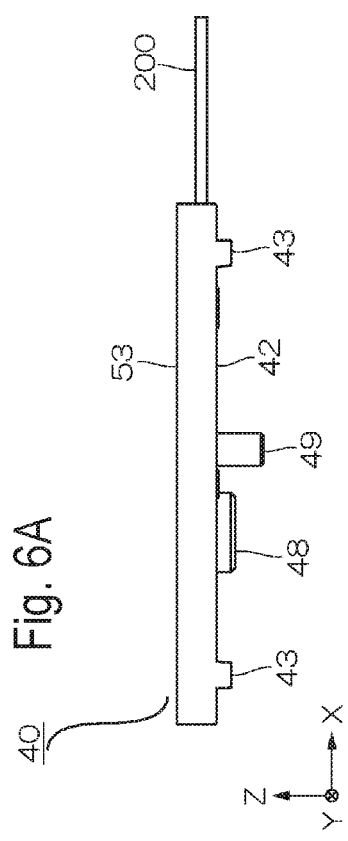
FIG. 6A is a front view of a second optical block in FIG. 2.
Figure 6B:
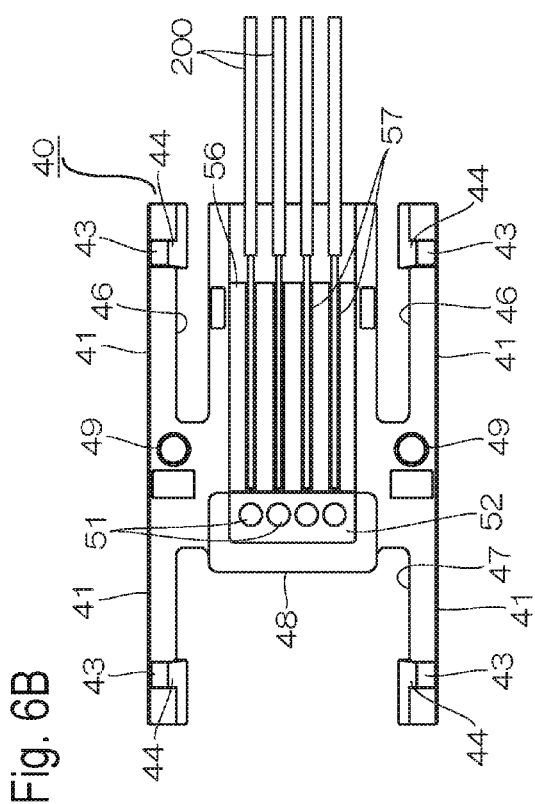
FIG. 6B is a bottom view of the second optical block shown in FIG. 6A.

FIG. 2 and FIGS. 3A to 3E are views showing a state in which an optical module according to an embodiment of the present invention is mounted on a board, and FIG. 4 is a view showing an optical device and an optical fiber optically connected by the optical module. An optical module 100 is composed of a first optical block 20 and a second optical block 40. FIGS. 5A to 5D and FIGS. 6A to 6D are views showing detailed structures of these optical blocks 20 and 40, and the structures of the optical blocks 20 and 40 will be first described below.

The optical block 20 has a planar shape formed by making small cuts at the four corners of a rectangle to make small rectangular notches 21 at the four corners, as shown in FIG. 5A to 5D, and the top face 22 has two long protruding parts 23 formed to protrude therefrom and also a table-like part 24 formed to protrude therefrom like a large table.

The two long protruding parts 23 are formed to extend longitudinally (in the longitudinal direction) from one longitudinal end of the optical block 20, that is, from one short side, and their inner ends are located roughly at the center of the optical block 20. The outer ends of the two long protruding parts 23 are located at both ends of the short side of the optical block 20, and two of the notches 21 lie on their outer sides. In the parts where these notches 21 are located, depressed step parts 25 are formed in the outer faces of the two long protruding parts 23. The step part 25 is formed from a position a little lower than the top face of the long protruding part 23 to a bottom face 26 of the optical block 20.

The table-like part 24 is formed on the side of the other longitudinal end of the optical block 20, and the other short side of the optical block 20 is formed by the table-like part 24. Two of the notches 21 lie on the outer sides of the table-like part 24 in the direction of the short side, and in the parts where these notches 21 are located, depressed step parts 25 are formed also in the side faces of the table-like part 24, like the step parts 25 of the long protruding parts 23.

A rectangular depressed part 27 is formed in the top face of the table-like part 24, and a hole 28 is formed at the center of the depressed part 27. The hole 28 is a hole in which a step is formed and communicates with a space 29 for holding a device, formed in the bottom face 26 of the optical block 20.

In the top face 22 of the optical block 20, a rectangular depressed part 31 is formed next to one side of the table-like part 24 at an inner area with respect to the table-like part 24, and lenses 32 are formed at the bottom face of the depressed part 31. In this example, four lenses 32 are formed in a row in the direction of the short side of the optical block 20. The side face of the table-like part 24, next to which the depressed part 31 is formed, is a slope, which is configured as a guide slope 33 to be used when a raised part of the optical block 40 is fitted into the depressed part 31, as described later.

A semi-elongated-hole notch 34 is formed at the center of each of the two opposing long sides of the optical block 20. The two semi-elongated-hole notches 34 are formed in such positions that they face each other.

The optical block 20 having the structure as described above is made of a resin which allows light to pass through and is formed by resin molding.

The optical block 40 has a structure as shown in FIGS. 6A to 6D, and holds optical fibers 200. FIGS. 6A to 6D show that four optical fibers 200 are held.

The optical block 40 has a planar shape in which one short side of a rectangle is cut largely. In this example, four spring pieces 41 are formed in the optical block 40, and two spring pieces 41 are disposed on each long side. The base end of each spring piece 41 is near the center of the long side, and the distal end is disposed in the end part of the long side, which is in the corner part of the optical block 40. A protrusion 43 is formed close to the distal end of each spring piece 41 and sticks out from the bottom face 42 of the optical block 40, and an abutting slope 44 is formed on the protrusion 43. The abutting slope 44 is formed to extend from the protruding end of the protrusion 43 to a part near the center of each spring piece 41 in the thickness direction, that is, to a part near the center of the thickness of the optical block 40. Each spring piece 41 has a lug portion 45 formed to extend from the top end of the abutting slope 44.

The two abutting slopes 44 disposed close to one end in the longitudinal direction of the optical block 40 are formed to face each other and to become distant from each other toward tips of the protrusions 43. These two abutting slopes 44 are mirror images of each other, and the protrusions 43 taper off toward the tips because the abutting slopes 44 are formed. The two abutting slopes 44 disposed close to the other end in the longitudinal direction are formed in the same manner. The two abutting slopes 44 disposed close to both ends in the longitudinal direction, that is, at each long side, are formed to be positioned in the same plane. These four abutting slopes 44 are formed with high position precision and high inclination angle precision.

A long cut 46 is made on the inner side of each of the two spring pieces 41 disposed on one side in the longitudinal direction of the optical block 40, and the spring pieces 41 are formed by the presence of the long cuts 46. On the other hand, the two spring pieces 41 disposed on the other side in the longitudinal direction of the optical block 40 are separated by the large cut as described earlier, and the spring pieces 41 are formed by the presence of the large cut 47.

On the bottom face 42 of the optical block 40, a rectangular raised part 48 is formed in a protruding manner, and two guide pins 49 are also formed protrusively. The two guide pins 49 are formed to position slightly inside the long sides of the optical block 40 at the centers of the long sides. The raised part 48 is formed next to the cut 47, and lenses 51 are formed in the top face of the raised part 48. In this example, the lenses 51 are formed in a lens formation face 52 depressed from the top face of the raised part 48, and four lenses are formed in a row in the direction of the short side of the optical block 40.

At the top face 53 of the optical block 40 corresponding to the part where the raised part 48 is formed, a depressed part 54 is formed, and a reflecting surface 55 is formed at a portion above the lenses 51 in the inner face of this depressed part 54.

A part between the two long cuts 46 is used to hold optical fibers, and a depressed part 56 for accommodating and holding the optical fibers is formed in the bottom face 42 of the optical block 40. Four V-grooves 57 are formed near the lenses 51 in the depressed part 56 at positions corresponding to the four lenses 51. The optical fibers 200 are placed in these V-grooves 57 to be positioned and secured therein. The optical fibers 200 are secured by adhesion.

Like the optical block 20, the optical block 40 is made of a resin which allows light to pass through and is formed by resin molding.

The optical module 100 composed of the optical blocks 20 and 40 having the structures as described above is mounted on a board. When it is mounted, the optical block 20 is first placed on the board and secured by adhesion, then the optical block 40 holding the optical fibers 200 is mounted on the optical block 20 and fitted with the optical block 20. The optical module 100 is mounted on a board 300 as shown in FIG. 2 and FIGS. 3A to 3E.

The board 300 is equipped with optical devices 400, as shown in FIG. 3D, and the optical block 20 is mounted on and secured to the board 300 such that the lenses 32 are positioned above the optical devices 400, that is, the optical axes of the optical devices 400 and the optical axes of the lenses 32 are aligned. The optical devices 400 are positioned to be accommodated in the space 29 formed in the bottom face 26 of the optical block 20. The optical block 40 is fitted with and secured to the optical block 20 with high precision, as will be described later, such that the optical axes of the lenses 51 (the geometric centers of the lenses 51) are aligned with the optical axes of the lenses 32 (the geometric centers of the lenses 32) of the optical block 20. When the optical block 20 is secured to the board 300 by adhesion, the expansion of gas in the space 29 could change the position of the optical block 20, but the hole 28 can let the gas escape and can prevent that type of position change from occurring in this example. After the adhesion of the optical block 20 to the board 300 is completed, the hole 28 is sealed with a sealant By mounting the optical module 100 on the board 300 as described above, the optical devices 400 mounted on the board 300 and the optical fibers 200 held in the optical module 100 are optically connected. The optical devices 400 are light-emitting devices such as vertical cavity surface emitting lasers (VCSELs) or light-receiving devices such as photo diodes (Ps), and a maximum of four optical devices 400 and a maximum of four optical fibers 200 are optically connected in this example.

FIG. 4 shows details of the optical connection between an optical device 400 and an optical fiber 200, and the optical device 400 is a VCSEL in FIG. 4.

An outgoing beam 71 exiting from the optical device 400 is converted to collimated light 72 by the lens 32, and the collimated light 72 passes through the space and reaches the lens 51. The collimated light 72 is collected by the lens 51, is deflected by 90° in the traveling direction at the reflecting surface 55, reaches an end face of the optical fiber 200, enters the end face of the optical fiber 200, and travels through the optical fiber 200. As described above, in this example, the optical device 400 and the optical fiber 200 are optically connected through the lenses 32 and 51 formed on the opposing faces of the optical blocks 20 and 40 and the reflecting surface 55 formed on the optical block 40.

Next, the fitting process of the optical block 20 and the optical block 40 will be described in detail with reference to FIGS. 7A, 7B, 8A, and 8B.

(1) The optical block 40 is placed above the optical block 20 which has been positioned on the board 300 and secured by adhesion and is roughly aligned with the optical block 20, as shown in FIG. 7A. The rough positioning of the optical blocks 20 and 40 is performed by using their visible shapes. The visible shapes used for positioning are the external shapes of the optical blocks 20 and 40, for example. In this example, besides (a) the external shapes of the optical blocks 20 and 40, (b) the long cuts 46 in the optical block 40 and the long protruding parts 23 of the optical block 20 to be inserted into the long cuts 46, and (c) the guide pins 49 of the optical block 40 and the semi-elongated-hole notches 34 of the optical block 20 into which the guide pins 49 are inserted are also visible and can be used for rough positioning.

(2) As the optical block 40 is brought close to the optical block 20, the guide pins 49 start entering the semi-elongated-hole notches 34, as shown in FIG. 7B.

(3) When the optical block 40 is brought closer to the optical block 20, the guide pins 49 are partly inserted into the semi-elongated-hole notches 34, as shown in FIG. 8A, and the long protruding parts 23 start entering the long cuts 46. Then, at least one of the four abutting slopes 44 disposed close to the distal ends of the four spring pieces 41 of the optical block 40 meets an edge of the optical block 20, more specifically, either an edge 35 of the corresponding long protruding part 23 on the side of the corresponding notch 21 (see FIG. 5A) or an edge 36 of the table-like part 24 on the side of the corresponding notch 21 (see FIG. 5A).

(4) Since the abutting slopes 44 are formed on the spring pieces 41, by pushing the optical block 40 downward, the spring pieces 41 are bent and spread outward, allowing the optical block 40 to be pushed down further until all the four abutting slopes 44 meet the edges 35 and 36 of the optical block 20. This makes the optical blocks 20 and 40 parallel and places them in the same orientation, and because the optical block 20 is held between the opposing abutting slopes 44, the optical blocks 20 and 40 are positioned in the direction in which they are held. The two edges 35 and the two edges 36 of the optical block 20 are formed with high position precision.

Here, let the longitudinal direction (direction of the long side) of the optical blocks 20 and 40 be the X-axis direction, the direction (direction of the short side) orthogonal to the X-axis direction in the opposing faces of the optical blocks 20 and 40 be the Y-axis direction, and the direction in which the optical blocks 20 and 40 are engaged (direction orthogonal to the X-axis and the Y-axis) be the Z-axis direction.

FIGS. 9A to 9C show that the optical block 40 is turned around the Y-axis and inclined with respect to the optical block 20, and just two abutting slopes 44 disposed close to one end in the X-axis direction meet the edges 36 of the optical block 20; and FIGS. 10A to 10D show that the optical block 40 is turned around the Z-axis and its orientation differs from that of the optical block 20 and just two abutting slopes 44 disposed at one diagonal line meet the edges 35 and 36 of the optical block 20. Even though the optical block 40 is turned around the Y-axis or the Z-axis, as described above, or even the X-axis with respect to the optical block 20, by pushing down the optical block 40 until all the four abutting slopes 44 meet the edges 35 and 36 of the optical block 20, the displacement of the optical block 40 around the X-axis, the Y-axis, or the Z-axis with respect to the optical block 20 can be corrected, and thereby the optical blocks 20 and 40 can become parallel and can be placed in the same orientation.

(5) When the optical block 40 is pushed down further, the raised part 48 of the optical block 40 meets the guide slope 33 of the optical block 20, and as the optical block 40 is pushed down, the guide slope 33 guides the raised part 48 of the optical block 40 into the depressed part 31 of the optical block 20 and lets it engage with the depressed part 31. When the raised part 48 of the optical block 40 is fitted into the depressed part 31 of the optical block 20 as described above, high-precision positioning of the optical blocks 20 and 40 is accomplished.

The abutting slopes 44 of the optical block 40 are parallel to the X-axis, whereas the guide slope 33 of the optical block 20 is parallel to the Y-axis. The high-precision positioned state of the optical blocks 20 and 40 in the direction of the Y-axis can be obtained by holding the optical block 20 between the abutting slopes 44 facing each other, as described above, but the positioning precision in the X-axis direction may be insufficient, and the raised part 48 of the optical block 40 can be displaced in the X-axis direction with respect to the depressed part 31 of the optical block 20. The guide slope 33 of the optical block 20 has a function of correcting the displacement and guiding the raised part 48 into the depressed part 31.

(6) When the optical block 40 is pushed down to a given position, the abutting slopes 44 first, and then the lug portions 45 disposed on the spring pieces 41 reach the step parts 25 of the optical block 20, as shown in FIG. 8B, and this causes the spring pieces 41 that have been spread outward to return to their original positions. When the lug portions 45 are caught on the upper ends of the step parts 25, the optical blocks 20 and 40 are secured to each other, and the fitting of the raised part 48 of the optical block 40 and the depressed part 31 of the optical block 20 is thus completed.

In this example, a first positioning means of the optical blocks 20 and 40 is configured by their visible shapes while the optical block 40 is placed above the optical block 20, a second positioning means is configured by the spring pieces 41 of the optical block 40, the spring pieces 41 having the protrusions 43, close to the distal ends, with the abutting slope 44, and by the edges 35 and 36 of the optical block 20 which meet the abutting slopes 44, and a third positioning means is configured by the raised part 48 of the optical block 40, the depressed part 31 of the optical block 20, and the guide slope 33 which guides the raised part 48 into the depressed part 31, as described above, and positioning is performed stepwise.

In order to align, with high precision, the optical axes of the lenses 32 and 51 formed on the surfaces of the optical blocks 20 and 40 facing each other, high-precision fitting of the raised part 48 of the optical block 40 into the depressed part 31 of the optical block 20, which is the third step of positioning, is required, but if the optical blocks 20 and 40 are first positioned under visual observation, then just by pressing the optical block 40 against the optical block 20, the positioning gradually advances; that is, a high-precision positioned state can be established stepwise.

Accordingly, even if the raised part 48 of the optical block 40 and the depressed part 31 of the optical block 20, which must be fitted with high precision, cannot be recognized visually, the task of fitting them can be carried out easily.

Visible shapes that are used in the first step of positioning in this example include, as described before, (a) the external shapes of the optical blocks 20 and 40,
(b) the long cuts 46 in the optical block 40 and the long protruding parts 23 of the optical block 20 to be inserted into the long cuts 46, and
(c) the guide pins 49 of the optical block 40 and the semi-elongated-hole notches 34 of the optical block 20 into which the guide pins 49 are inserted, and any of them can be used, but it is preferred to use (b) in view of visibility.

On the other hand, the optical blocks 20 and 40 are roughly positioned by inserting the guide pins 49 into the semi-elongated-hole notches 34 and by inserting the long protruding parts 23 into the long cuts 46, but the positioning by these means must allow the second and third steps of positioning. Therefore, both the clearance between the guide pins 49 and the semi-elongated-hole notches 34 and the clearance between the long protruding parts 23 and the long cuts 46 must be larger than the clearance between the raised part 48 and the depressed part 31, for example.

The final or the third step of positioning must be carried out after the second step of positioning. Therefore, in a state in which the optical block 20 and the optical block 40 have been aligned completely in the X-axis and Y-axis directions and the optical block 40 has been placed on the optical block 20 to face it and be parallel thereto, the distance in the Z-axis direction between the top face of the raised part 48 of the optical block 40 and the plane of the opening of the depressed part 31 of the optical block 20, which is the top face 22 of the optical block 20, must be greater than the distance in the Z-axis direction between the edges 35 and 36 of the optical block 20 and parts of the abutting slopes 44 of the optical block 40 directly above the edges 35 and 36.

In order to obtain good optical coupling efficiency, the lenses 32 in the optical block 20 and the lenses 51 in the optical block 40 must have their optical axes aligned with high precision, but since the optical coupling between the lenses 32 and the lenses 51 is implemented by free-space transmission of the collimated light 72, the positioning of the optical blocks 20 and 40 in the Z-axis direction does not necessarily require high precision.

The embodiment of the present invention has been described above, but the lenses 32 and 51 the optical axes of which must be aligned are not necessarily formed on the opposing faces of the optical blocks 20 and 40. For example, even though the lenses 32 are formed on a surface of the optical block 20 facing the optical devices 400 or even though the lenses 51 are formed on the reflecting surface 55 of the optical block 40, the optical axes of the lenses (the geometric centers of the lenses) can still be aligned with high precision.

If the external shapes of the optical blocks 20 and 40 are used for visual positioning in the first step, components such as the guide pins 49 and the semi-elongated-hole notches 34, or the long cuts 46 and the long protruding parts 23 are not necessarily required.

The guide pins 49 and the semi-elongated-hole notches 34 into which the guide pins 49 are inserted in this example can be exchanged: The guide pins 49 may be disposed in the optical block 20, and the semi-elongated-hole notches 34 may be disposed in the optical block 40. Likewise, the raised part 48, and the depressed part 31 into which the raised part 48 is fitted and the guide slope 33 in this example can be exchanged: The raised part 48 may be disposed in the optical block 20, and the depressed part 31 and the guide slope 33 may be disposed in the optical block 40.

The edges 35 and 36 of the optical block 20 which meet the abutting slopes 44 in this example have slightly chamfered shapes, but chamfering is not necessarily required; on the contrary, an oblique face or a curved face may be formed purposefully on the edges 35 and 36.

This example has such a structure that the spring pieces 41 of the optical block 40 are pushed outward, the abutting slopes 44 facing each other hold the optical block 20 between them, and finally the lug portions 45 get caught on the step parts 25 of the optical block 20 from the outside, but the orientation of the abutting slopes 44 and the step parts 25 can be inverted, for example. To be more specific, the abutting slopes 44 may be formed to face outward, the spring pieces 41 may be pushed inward and then return, and the lug portions 45 may be caught on the step parts 25 from the inside. In either case, the same action and effect can be obtained if the two abutting slopes 44 each disposed close to one end and close to the other end in the longitudinal direction of the optical block 40 are formed to make mirror images of each other, and if the protrusions 43 sticking out toward the optical block 20 taper off to the protruding ends.

The optical blocks 20 and 40 are secured to each other by the lug portions 45 of the optical block 40 being caught on the optical block 40, but they can be secured by other means, such as adhesion.

What is claimed is:

1. An optical module comprising a first optical block having a first lens and a second optical block having a second lens, wherein
    the first optical block is combined with the second optical block;
    the first optical block includes four ridge-like portions;
    the second optical block includes four rod-like spring portions disposed in a same extension direction, four protrusions peaking toward the first optical block, and four slopes disposed on a same plane and parallel to the extension direction;
    each of the four rod-like spring portions has, at a distal end portion thereof, a corresponding one of the four protrusions and a corresponding one of the four slopes which is formed on the corresponding one of the four protrusions;
    the four rod-like spring portions are positioned such that the four slopes are positioned in a vicinity of four corners of the second optical block;
    one of the four slopes and another of the four slopes, which constitute a first pair, are situated in a mirror-image symmetry;
    one of remaining two slopes and another of the remaining two slopes, which constitute a second pair, are situated in a mirror-image symmetry;
    one of the first optical block and the second optical block has a raised part, and another of the first optical block and the second optical block has a depressed part into which the raised part is fitted, and a guide slope which guides the raised part into the depressed part;
    the guide slope is parallel to a direction that is orthogonal to the extension direction and is orthogonal to a facing direction in which the first optical block and the second optical block face to each other;
    the first optical block and the second optical block are configured respectively such that a), in a course of combining the first optical block and the second optical block, the four ridge-like portions make contact with the four slopes before the raised part makes contact with the guide slope, and b), subsequent to contact of the four ridge-like portions with the four slopes, the raised part makes contact with the guide slope after curving first two of the four rod-like spring portions and curving second two of the four rod-like spring portions by pressing one of the first optical block and the second optical block to another of the first optical block and the second optical block, the first two of the four rod-like spring portions including said first pair and the second two of the four rod-like spring portions including said second pair; and
    the first lens is aligned optically with the second lens at least by going through the contact of the four ridge-like portions with the four slopes and contact of the raised part with the guide slope.

2. The optical module according to claim 1, wherein,
    the first optical block and the second optical block are configured respectively such that c), when the second optical block is parallel placed over the first optical block in the course of combining the first optical block and the second optical block, a distance in the facing direction between a top face of the raised part and a plane including an opening of the depressed part is larger than a distance in the facing direction between the four ridge-like portions and portions of the four slopes directly above the four ridge-like portions.

3. The optical module according to claim 2, wherein
    one of the first optical block and the second optical block has a guide pin, and another of the first optical block and the second optical block has a notch into which the guide pin is inserted; and
    the first optical block and the second optical block are configured respectively such that d), in the course of combining the first optical block and the second optical block, the guide pin is inserted into the notch before the contact of the four ridge-like portions with the four slopes.

4. The optical module according to claim 2, wherein
    one of the first optical block and the second optical block has a long cut, and another of the first optical block and the second optical block has a long protruding part which is inserted into the long cut; and
    the first optical block and the second optical block are configured respectively such that e), in the course of combining the first optical block and the second optical block, the long protruding part is inserted into the long cut before the contact of the four ridge-like portions with the four slopes.

5. The optical module according to claim 1, wherein
    one of the first optical block and the second optical block has a guide pin, and another of the first optical block and the second optical block has a notch into which the guide pin is inserted; and
    the first optical block and the second optical block are configured respectively such that d), in the course of combining the first optical block and the second optical block, the guide pin is inserted into the notch before the contact of the four ridge-like portions with the four slopes.

6. The optical module according to claim 1, wherein
    one of the first optical block and the second optical block has a long cut, and another of the first optical block and the second optical block has a long protruding part which is inserted into the long cut; and the first optical block and the second optical block are configured respectively such that e), in the course of combining the first optical block and the second optical block, the long protruding part is inserted into the long cut before the contact of the four ridge-like portions with the four slopes.

7. The optical module according to claim 1, wherein
the four protrusions have lug portions; and
the lug portions each getting caught on a step part which the first optical block includes secure the first optical block to the second optical block.

8. The optical module according to claim 1, wherein
the first lens is positioned at a top face of the raised part; and
the second lens is positioned at a bottom face of the depressed part.

9. The optical module according to claim 1, wherein
the first optical block is mounted on a board equipped with an optical device; and
the second optical block has a structure for positioning and holding an optical fiber.

* * * * *